(12) United States Patent
Wada et al.

(10) Patent No.: US 6,502,021 B2
(45) Date of Patent: Dec. 31, 2002

(54) VEHICLE CONTROL COMPUTER APPARATUS HAVING SELF-DIAGNOSIS FUNCTION

(75) Inventors: Yasutake Wada, Okazaki (JP); Takanao Suzuki, Toyohashi (JP)

(73) Assignee: Denso Corporation, Kariya (JP)

( * ) Notice: Subject to any disclaimer, the term of this patent is extended or adjusted under 35 U.S.C. 154(b) by 45 days.

(21) Appl. No.: 09/750,784

(22) Filed: Jan. 2, 2001

(65) Prior Publication Data

US 2001/0008987 A1 Jul. 19, 2001

(30) Foreign Application Priority Data

Jan. 14, 2000 (JP) ........................................ 2000-006637
Nov. 29, 2000 (JP) ........................................ 2000-362967

(51) Int. Cl.⁷ ............................ G06F 7/00; F02D 45/00
(52) U.S. Cl. ............................ 701/31; 701/29; 701/35
(58) Field of Search ............................ 701/29, 31, 32, 701/33, 34, 35

(56) References Cited

U.S. PATENT DOCUMENTS

| 4,618,954 A | * | 10/1986 | Otobe et al. ............... 714/45 |
| 5,005,129 A | * | 4/1991 | Abe et al. ................... 701/31 |
| 5,276,619 A | * | 1/1994 | Ohara et al. ............... 123/479 |
| 5,491,631 A | * | 2/1996 | Shirane et al. ............. 123/479 |
| 5,590,040 A | * | 12/1996 | Abe et al. ................... 340/438 |
| 5,696,676 A | | 12/1997 | Takaba |
| 5,880,361 A | | 3/1999 | Taniguchi |
| 5,964,813 A | * | 10/1999 | Ishii et al. .................. 701/29 |
| 6,115,653 A | * | 9/2000 | Bergstrom et al. ......... 123/479 |

FOREIGN PATENT DOCUMENTS

| JP | 63-154733 | 10/1988 |
| JP | 6-341344 | 12/1994 |
| JP | 7-36727 | 2/1995 |

* cited by examiner

Primary Examiner—Michael J. Zanelli
Assistant Examiner—Eric M Gibson
(74) Attorney, Agent, or Firm—Nixon & Vanderhye P.C.

(57) ABSTRACT

In a vehicle control computer apparatus, information operation processing is performed by a RISC-type microcomputer so that a storage area necessary in diagnosis is reduced and the number of designing steps of processing program is reduced. Status data within the range "0" to "179" is used for storing a determination status indicating the result of diagnosis. That is, a first normal status is stored as "1", a second normal status as "2" to "38", or "130" to "166", a third normal status as "39", "40", "166" or "168", a temporary normal status as "50", "51", "178" or "179", and an abnormal status as "41". The status is changed by increasing/decreasing the status data, and output control is performed in correspondence with the determination status.

34 Claims, 4 Drawing Sheets

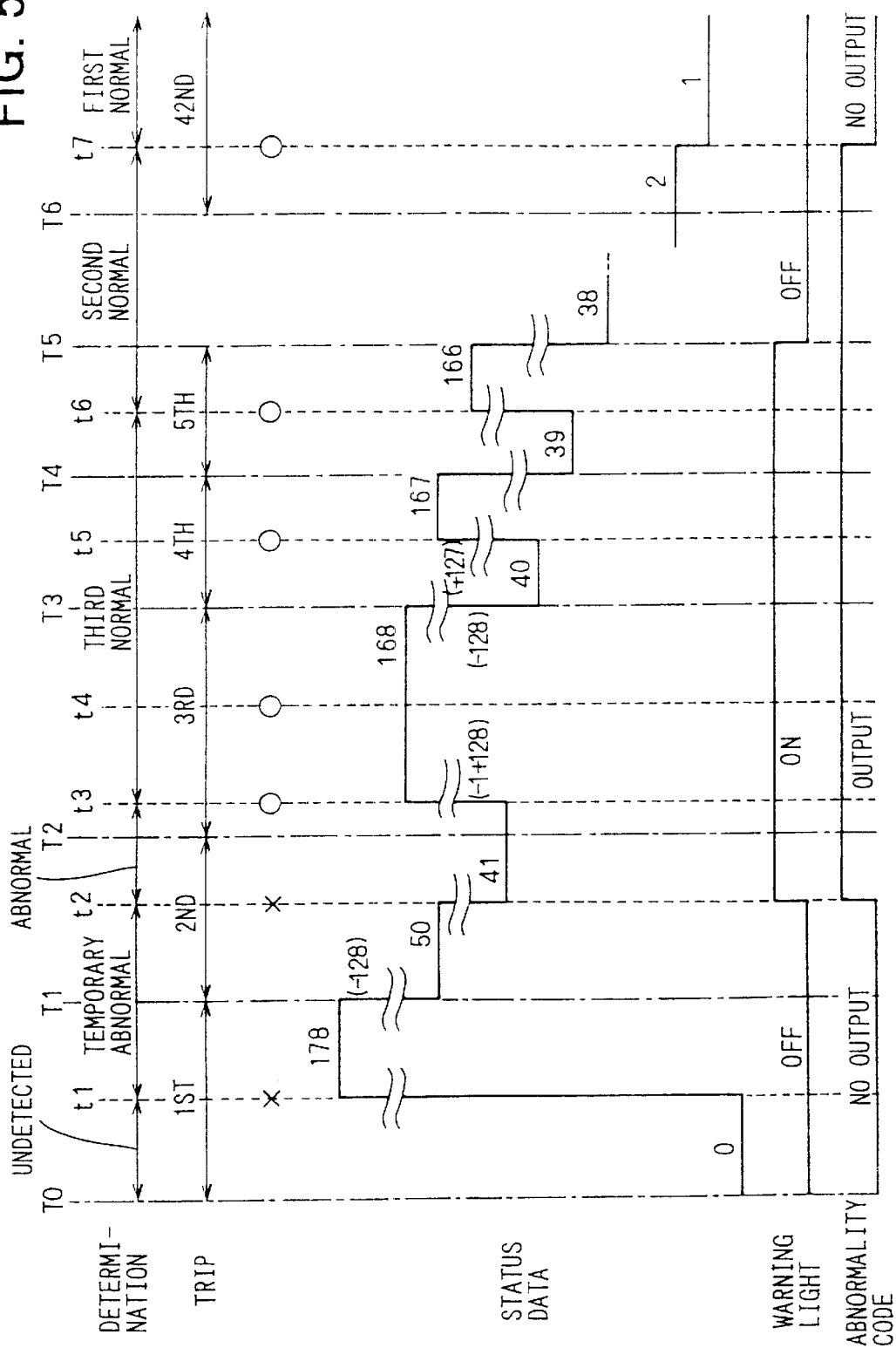

VEHICLE CONTROL COMPUTER APPARATUS HAVING SELF-DIAGNOSIS FUNCTION

CROSS REFERENCE TO RELATED APPLICATION

This application is based on and incorporates herein by reference Japanese Patent Applications No. 2000-6637 filed Jan. 14, 2000 and No. 2000-362967 filed Nov. 29, 2000.

BACKGROUND OF THE INVENTION

1. Field of the Invention

The present invention relates to a self-diagnosis of a vehicle control computer system.

2. Related Art

In a vehicle control computer apparatus, if abnormality detection for the respective system parts such as sensors and actuators cannot be properly made, an undesired trouble might occur in running, and at worst, the running might be disabled. For this reason, the computer apparatus using CISC-type microcomputer, for instance, is provided with a self-diagnosis function for improvement in reliability. That is, operating statuses of a computer part, sensors and the like are automatically checked at appropriate intervals. When an abnormality is detected continuously, a warning light is turned on to notify a user of the abnormality, and/or an abnormality code to notify a repair person of the content of the abnormality is outputted, thus realizing a diagnosis function.

Since the result of abnormality detection (determination status) is stored as 1-bit flag information in a normal RAM (volatile memory), a battery backup RAM (nonvolatile memory), EEPROM (nonvolatile memory) or the like, a large storage area is necessitated for one diagnostic item. In case of diagnostic processing for about 200 diagnostic items, the total storage area for the determination status is not negligible.

Further, in recent years, a RISC-type microcomputer, having an increased computation speed, with use of reduced number of commands, is mainly used. In the RISC microcomputer, byte-unit operation commands are used, whereas bit operation commands tend to decrease. If there is no bit operation command, it is necessary to combine plural commands, which reduces the computation operation speed.

In order to solve this problem, byte-unit data operation executable by 1 command is made. For example, if the most significant bit is set in 1 byte area, "128" (10000000 in binary representation) is stored. That is, as no bit operation command is used in the RISC microcomputer, to avoid reduction of computation speed, it is necessary to ensure a storage area in 1 byte units. As a result, the storage area is wastefully used.

In a conventional method of storing the diagnosis result as flag information, since a processing program on the basis of bit operation is designed in the RISC microcomputer in which no bit operation command is used. The designing is disadvantageous from the point of the number of designing steps. In some cases, actually bit-unit operations are made, and in such cases, the computation speed is lowered.

SUMMARY OF THE INVENTION

The present invention has its object to reduce a storage area necessary for diagnosis and to reduce the number of designing steps of processing program, while enabling information processing operation in a RISC-type microcomputer.

According to the present invention, a vehicle control apparatus having a diagnosis function stores diagnosis determination status of different levels as numerical values set in correspondence with each determination status while avoiding mutual numerical overlap among the different levels. Preferably, the numerical value is within a range of 0 to 255 which can be defined by a single byte.

The apparatus executes a determination status transition processing to change the stored determination status of a previous trip period to a new determination state when the determination status changes between successive trip periods. In this instance, the numerical value is set within a numerical range which is exclusive to each level of the diagnosis statuses. The apparatus increases or decreases the numerical value to attain the transition processing.

BRIEF DESCRIPTION OF THE DRAWINGS

The above and other objects, features and advantages of the present invention will become more apparent from the following detailed description made with reference to the accompanying drawings. In the drawings:

FIG. 5 is a timing chart particularly showing the transition of the diagnosis operation performed in the embodiment shown in FIG. 1.

DETAILED DESCRIPTION OF THE EMBODIMENT

Figure 1:
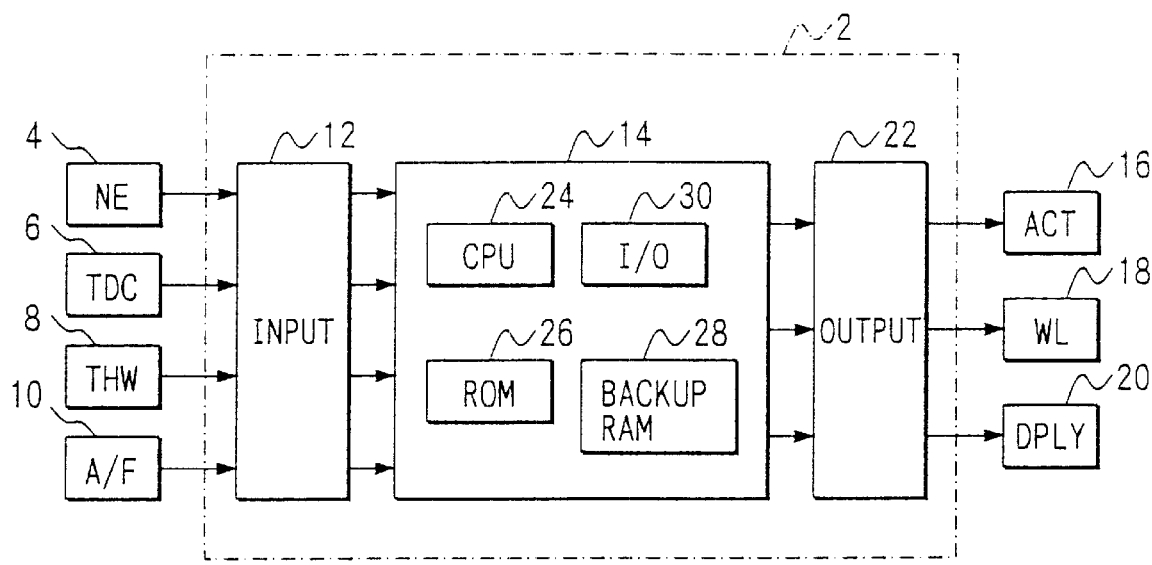
FIG. 1 is a block diagram showing an engine control apparatus according to an embodiment of the present invention.

Referring first to FIG. 1 showing an engine control system for controlling a vehicle-mounted internal combustion engine (not shown), an engine control unit (ECU) 2 has an input circuit 12 which inputs signals from various sensors to detect the driving status of the engine, and performs wave shaping and A/D conversion, a microcomputer 14 which performs various processes to control the engine operation based on sensor signals from the input circuit 12, and an output circuit 22 which drives an actuator (ACT) 16 for fuel injection devices attached to the engine, an ignition device or the like, a warning light (WL) 18 provided in a vehicle compartment, a display device (DPLY) 20 to display an abnormality code.

The sensors include a rotational angle sensor 4 which outputs a pulse signal (NE) every time a crankshaft of the engine rotates a predetermined angle, a reference position sensor 6 which outputs a pulse signal every time the piston of particular cylinder of the engine comes to a predetermined position, e.g., top dead center (TDC), a water temperature sensor 8 which detects the temperature (THW) of engine coolant, and an oxygen concentration sensor 10 which measures oxygen concentration (air-fuel ratio A/F). The warning light 18 and the display device 20 are used in diagnosis operation.

The microcomputer 14 has a CPU (central processing unit) 24 which executes engine control and diagnosis programs, a ROM 26 for storing the programs executed by the CPU 24 and control data referred to upon execution of the programs, a backup RAM 28 for storing the results of calculations by the CPU 24 and the like, an I/O 30 for signal transmission/reception between the input circuit 12 and the output circuit 22, various registers, and free-run counter (not shown) and the like. The backup RAM 28 is continuously supplied with an electric power to operate as a nonvolatile memory although RAM is a volatile memory. The ECU 2 performs engine control processing to drive the actuator 16 connected to the output circuit 22 based on signals inputted via the input circuit 12 from the respective sensors.

The ECU 2 performs diagnosis on the respective parts of the system and outputs the result of diagnosis, in addition to the engine control processing.

About 200 diagnostic items as objects of diagnosis, typical in the engine system are disconnection diagnosis of the water temperature sensor 8, the oxygen concentration sensor 10 and ignition failure diagnosis of the igniter. In the present embodiment, the disconnection diagnosis of the water temperature sensor 8 will be described. It is to be noted that the diagnosis of the other items is basically the same.

A signal from the water temperature sensor 8 is inputted via the input circuit 12 into the microcomputer 14. Generally, as the value of the signal from the water temperature sensor 8 varies within the range of 0 to 5 (V), if the value is continuously 0 V or 5 V during a predetermined period, it can be considered that wire breakage or short circuit has occurred in the water temperature sensor 8. Accordingly, the CPU 24 of the microcomputer 14 measures a period in which the signal value is continuously 0 V or 5 V by using a time counter. If the signal state has continued for a predetermined period, the CPU 24 determines the status as "abnormal". On the other hand, if the signal status has not continued for the predetermined period, the CPU 24 determines the status as "normal". The ECU 2 performs such normal/abnormal determination on the respective diagnostic items in addition to the engine control processing.

Even if the water temperature sensor 8 is determined as "abnormal" in one trip, as the status might be caused by temporary poor connection in an electrical connector or the like, the diagnosis is performed in plural trips.

More specifically, the CPU 24 of the microcomputer 14 determines the determination status indicating the result of diagnosis based on the normal/abnormal determination in the respective trips. Then, based on the determination status, the CPU 24 turns the warning light 18 on and/or displays an abnormality code on the display device 20. The determination status is stored into the backup RAM 28, and then in the next trip, the stored determination status is referred to and the determination status is changed to the next determination status when necessary.

In the present embodiment, decimal numerical values, not mutually overlapping with each other, within a predetermined range, are allotted to the respective determination statuses, and the determination statuses are stored as these numerical values (status data), and the determination status is changed in accordance with the stored status data St.

The determination statuses and the status data St allotted in correspondence with the following six determination statuses or levels (1) to (6).

(1) Undetected status: a status where normal/abnormal determination of the water temperature sensor 8 is not made in the first trip. Status data "0" is allotted to the status.

(2) First normal status: a fully normal status. Status data "1" is allotted to the status.

(3) Second normal status: a status which has been determined as abnormal within past 40 trips but determined as normal since then. Status data "2" to "38", or "130" to "166" is allotted to the status.

(4) Third normal status: a status which has been determined as abnormal within past 3 trips but determined as normal since then. Status data "39", "40", "166" or "168" is allotted to the status.

(5) Temporary abnormal status: a status determined as abnormal and was determined as normal in immediately previous determination. Status data "50", "51", "178" or "179" is allotted to the status.

(6) Abnormal status: a status determined as abnormal and was determined as abnormal in immediately previous determination. Status data "41" is allotted to the status.

It is to be noted that even in the same statuses, e.g., temporary abnormal statuses, the temporary abnormal status with the status data "50" and the temporary abnormal status with the status data "51" exist. Accordingly, in the following description, the temporary abnormal status with the status data "50" will be referred to as a temporary abnormal status "50" for convenience of explanation.

The CPU 24 of the microcomputer 14 performs status transition processing to change a determination status determined in a previous trip to a new determination status, and determines one determination status. Then, in the undetected status, the first normal status and the temporary abnormal status, the CPU 24 keeps the warning light 18 off and does not output the abnormality code. In the second normal status, the CPU 24 keeps the warning light 18 off, but displays the abnormality code on the display device 20. In the third normal status and the abnormal status, the CPU 24 turns the warning light 18 on and displays the abnormality code on the display device 20.

Next, the status transition processing to change the above 6 determination statuses based on normal/abnormal determination in each respective trip will be described. The status transition processing includes initial processing shown in a flowchart of FIG. 2 and transition processing shown in a flow chart of FIG. 3. It is to be noted that FIG. 4 shows transition of determination status.

Figure 2:
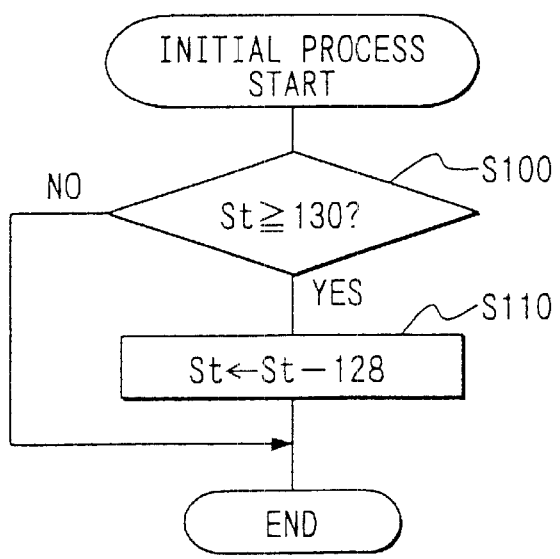
FIG. 2 is a flowchart showing initial processing executed in the embodiment shown in FIG. 1.

First, the initial processing shown in FIG. 2 is executed immediately after the ignition key becomes ON, i.e., at the beginning of each trip of a vehicle.

At step S100, it is checked whether or not the status data St is equal to or greater than "130". If it is determined that St≧130 holds (YES at step S100), a value "128" is subtracted from the status data St at step S110, then the initial processing ends. The processing at step S110 realizes transition denoted by an alphabet A in FIG. 4. On the other hand, if it is determined that St<130 holds (NO at step S100), the processing at step S110 is not performed, and the initial processing ends.

Figure 4:
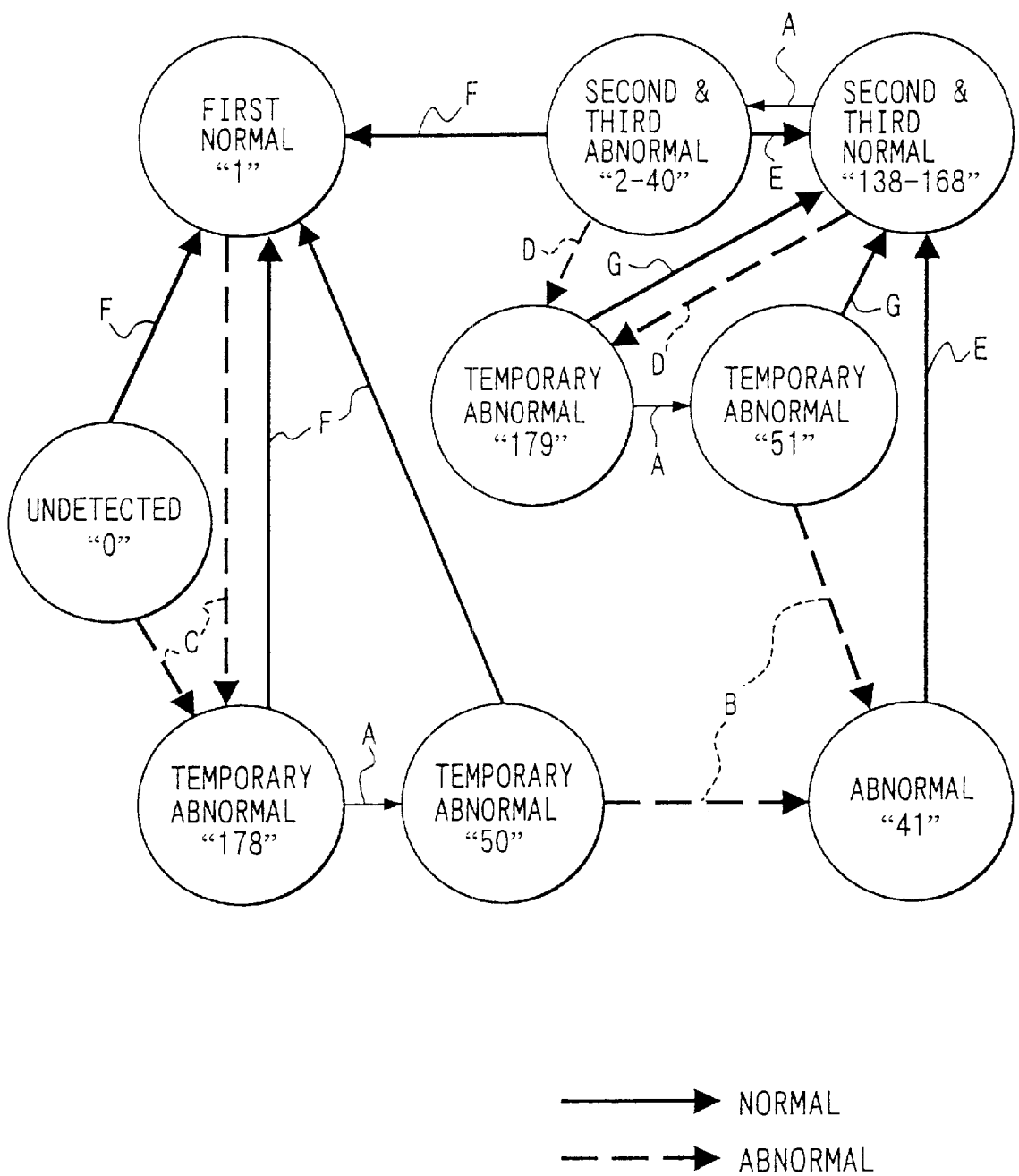
FIG. 4 is an explanatory view showing transition of diagnosis operation performed in the embodiment shown in FIG. 1.

As understood from FIG. 4, in the initial processing, the determination status is not changed but the status data St is changed for the following reason.

For example, in some trip ("trip A"), if transition from the undetected status to the temporary abnormal status is made, the status data is set as the temporary abnormal status "178". Thereafter, if determination as "abnormal" is made again in the next trip ("trip B"), the status data is set to the abnormal status "41". However, there is a possibility that determination as "abnormal" is continuously made twice in the trip A.

Accordingly, it is necessary to change the status to the temporary abnormal status in the trip A and prevent further transition to the abnormal status in the same trip A. For this purpose, immediately after the start of the trip B, the temporary abnormal status "178" is changed to the temporary abnormal status "50", and if determination as abnormal 1 is made in the temporary abnormal status "50", the status is changed to the abnormal status "41".

Next, the transition processing shown in FIG. 3 will be described. The processing is repeatedly performed at predetermined time intervals after the completion of the above-described initial processing.

First, at step S200, branching processing is performed to check whether or not the status of the water temperature sensor 8 has been determined as "abnormal". If the status of the water temperature sensor 8 has been determined as "abnormal", (YES at step S200), the process proceeds to step S210. On the other hand, if the status has not been determined as "abnormal", (NO at step S200), the process proceeds to step S270.

At step S210, it is checked whether the status data St is "50" or "51". If it is determined that St=50, 51 holds (YES at step S210), i.e., the status is the temporary abnormal status, a "41" is substituted into the status data St to change or set the status to the abnormal status at step S220, then the process proceeds to step S270. The processing at step S220 realizes the status transition denoted by an alphabet B in FIG. 4. On the other hand, if St≠50, 51 holds (NO at step S210), the process proceeds to step S230.

At step S230, it is checked whether the status data St is "0" or "1". If it is determined that St=0,1 holds (YES at step S230), i.e., the status is the undetected status "0" or the first normal status "1", the value "178" is substituted into the status data St to change or set the status to the temporary abnormal status at step S240, then the process proceeds to step S270. The process at step S240 realizes the status transition denoted by an alphabet C in FIG. 4. On the other hand, if it is determined that St≠0,1 holds (NO at step S230), the process proceeds to step S250.

At step S250, it is checked whether the status data St is "2" to "40" or "130" to "168". If it is determined that St=2–40, 130–168 holds (YES at step S250), i.e., the status is the second or third normal status, a value "179" is substituted into the status data St to change or set the status to the temporary abnormal status at step S260, then the process proceeds to step S270. The processing at step S260 realizes the status transition denoted by an alphabet D in FIG. 4. On the other hand, if it is determined that St#2–40, 130–168 holds (NO at step S250), the process proceeds to step S270.

If negative determination is made at step S200, after the completion of the processing at steps S220, S240 and S260, or at step S270 following step S250 in case of negative determination, branching processing is performed in accordance with whether or not the status of the water temperature sensor 8 has been determined as "normal". If it the status of the water temperature sensor 8 has been determined as "normal (YES at step S270), the process proceeds to step S280. On the other hand, if the status has not been determined as "normal" (NO at step S270), the transition processing ends.

At step S280, it is checked whether or not the status data St is "3" to "41". If it is determined that St=3–41 holds (YES at step S280), a value "127" is added to the status data St at step S290, then the transition processing ends. The processing at step S290 corresponds to the transition denoted by an alphabet E in FIG. 4. On the other hand, if it is determined that St≠3–41 holds (NO at step S280), the process proceeds to step S300.

At step S290, performed are decrement processing (to subtract a value "1" from the status data St) for counting the number of trips where determination as "normal" has been continuously made. Processing not to continuously perform the decrement processing (to add a value "128" to the status data St) even if determination as "normal" is continuously made within the same trip. That is, the addition of the value "128" to the status data St means that determination as "normal" has already been made in the trip. Further, in a case where the status is determined as the abnormal status but determination as "normal" is continuously made at the next and subsequent trips, the status data St is sequentially decremented.

If determination as "abnormal" is not made in continuous 40 trips, the status is changed through the third and second normal statuses to the normal status. For this reason, at step S290, the value "128" is added to the status data St and the value "1" is subtracted from the status data St, i.e., the value "127" is added to the status data.

At step S300, it is checked whether or not the status data St is "0", "2", "50" or "178". If it is determined that St=0, 2, 50, 178 holds (YES at step S300), "1" is substituted into St to change or set the status to the first normal status at step S310, then the transition processing ends. The processing at step S310 corresponds to the status transition denoted by an alphabet F in FIG. 4. On the other hand, if St≠0, 2, 50, 178 holds (NO at step S300), the process proceeds to step S320.

At step S320, it is checked whether or not the status data St is "51" or "179". If it is determined that St=50, 179 holds (YES at step S320), a value "168" is substituted into the status data St to change or set the status to the third normal status at step S330, then the transition processing ends. The processing at step S330 realizes the status transition denoted by an alphabet G in FIG. 4. On the other hand, if it is determined that St≠51, 170 holds (NO at step S320), the transition processing ends.

Next, the initial processing and the transition processing will be described with a particular example.

FIG. 5 is a timing chart showing a determination status by diagnosis, the number of trips, the status data St stored in the backup RAM 28, ON/OFF state of the warning light and abnormality code output, in correspondence with each other. In FIG. 5, a period [T0,T1] represents the first trip; a period [T1,T2], the second trip; a period [T2,T3], the third trip; a period [T3,T4], the fourth trip; and a period [T4,T5], the fifth trip. The subsequent trips are omitted from the figure, and then time T6 and subsequent time represent the forty-second trip.

In the 1st trip from time T0, the status of the water temperature sensor 8 is determined as "abnormal" (x) at time t1. Accordingly, the determination status is changed from the undetected status "0" to the temporary abnormal status "178" (YES at step S230 and step S240 in FIG. 3).

Next, when the 2nd trip from time T1 is started, the value "128" is subtracted from the status data "178" (YES at step S100 and step S110 in FIG. 2). Then if the status of the water temperature sensor 8 is determined as "abnormal" at time t2, the status is changed from the temporary abnormal status "50" to the abnormal status "41" (YES at step S210 and step S220 in FIG. 3). In the abnormal status, a warning light is turned on, and an abnormality code is outputted. That is, the warning light 18 connected to the output circuit 22 is turned on and the abnormality code is displayed on the display device 20. The abnormality code may be outputted to the backup RAM 28.

In the 3rd trip from time T2, first, the status of the water temperature sensor 8 is determined as "normal" (o) at time t3. Accordingly, the determination status is changed from the abnormal status "41" to the third abnormal status "168", (YES at step S280 and step S290 in FIG. 3). That is, the value "1" is subtracted from the status data St and the value "128" is added to the status data. Accordingly, even though the status of the water temperature sensor 8 is determined as "normal" at time t4, it is found that determination as "normal" has been already made in the 3rd trip and further processing is not performed. In the third normal status, as in the case of the abnormal status, the warning light 18 is turned on and the abnormality code is outputted.

When the 4th trip from time T3 is started, the value "128" is subtracted from the status data St "168" (YES at step S100 and step S110 in FIG. 2). Then, if the status of the water temperature sensor 8 is determined as "normal" at time t5, the value "127" is added to the status data St while the third normal status is maintained. Thus the data becomes "167" (YES at step S280 in FIG. 3).

In the following 5th trip, the third normal status "39" is changed to the second normal status "166" at time t6. In the second normal status, the warning light 18 is turned off but the abnormality code is outputted.

Similarly, if the status of the water temperature sensor 8 is determined as "normal" in the subsequent trips, the value "128" is subtracted from the status data St immediately after the start of each trip, and the value "127" is added to the status data upon determination as "normal". That is, as the status data is sequentially decremented by "1", the number of trips is counted.

Figure 3:
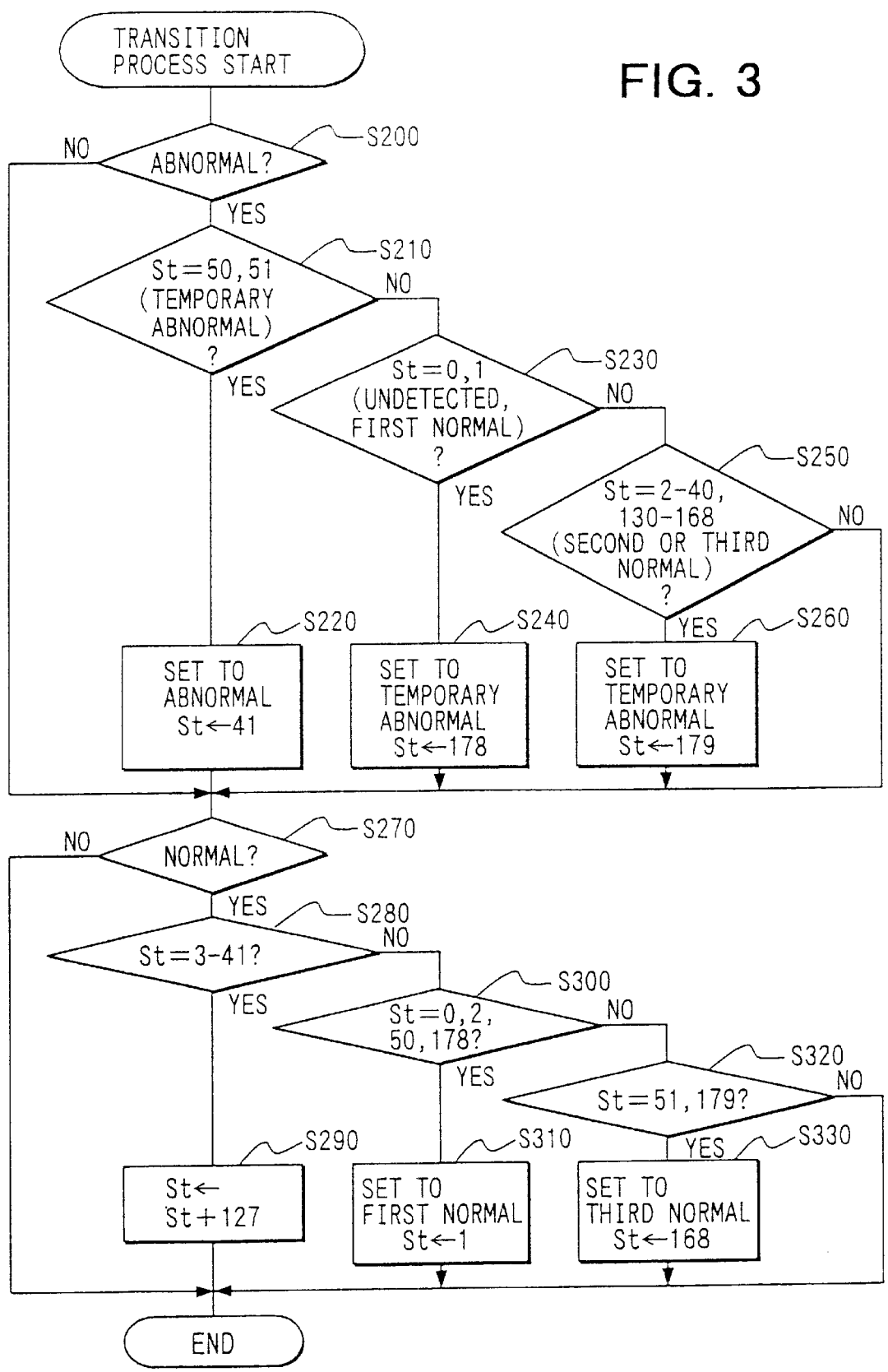
FIG. 3 is a flowchart showing transition processing executed in the embodiment shown in FIG. 1.

Then in the 42nd trip from time T6, if the status of the water temperature sensor 8 is determined as "normal" at time t7, the second normal status "2" is changed to the first normal status "1" (YES at step S300 in FIG. 3). In the first normal status, the warning light 18 is turned off, and the output of the abnormal code is stopped. In a case where the abnormality code is outputted to the backup RAM 28, the abnormality code is deleted.

As described above, in the present embodiment, the status data St within the range "0" to "179" is used to represent a determination status by diagnosis, and the status data St is stored into the backup RAM 28. Then, the determination status is changed by increasing/decreasing the status data St, and output control is made in correspondence with the data. Accordingly, only a 1 byte (8 bits, 0 to 255) area is used as the storage area for the diagnostic processing. Even if the status data St is stored as mirror data for verification of the status data St stored in the backup RAM 28, only 2 byte area is necessitated.

As a result, even in case of diagnostic processing for about 200 diagnostic items, a storage area of only about 400 bytes is necessitated. Further, if the contents of the RAM are stored into an EEPROM, the storage area used in the EEPROM is small.

Further, as the determination status is not stored as flag information as in the conventional art, the processing can be designed without consideration of bit operation. That is, as information operation is realized in correspondence with the RISC microcomputer for which no or few bit operation commands are used, the number of designing steps of the processing program can be reduced. Further, the computation speed is not lowered.

Further, in the present embodiment, the status data St indicating the undetected status is defined in advance as "0", and the undetected status is handled by using this status data St similarly to the other determination statuses. Accordingly, in case of undetected status, it is not necessary to perform any particular determination processing. In this point, the number of designing steps of the processing program can be reduced.

Still further, as the numerical values can be changed from 0 to 255, each determination status can be changed in the transition processing by incrementing or decrementing the numerical value in correspondence with a plurality of trip periods. Thus, a counter for counting the number of trips to monitor the continuity of the determination status can be eliminated.

As many apparently widely different embodiments of the present invention can be made without departing from the spirit and scope thereof, it is to be understood that the invention is not limited to the specific embodiments thereof except as defined in the appended claims.

What is claimed is:

1. A vehicle control apparatus having a diagnosis function comprising:

detection means for detecting a predetermined diagnosis item as normal or abnormal during a trip period of a vehicle as a running period from a point in which an ignition switch is turned on to a point in which the ignition switch is turned off;

determination status decision means for deciding a determination status indicating the result of diagnosis of the diagnostic item, based on the result of detection by the detection means;

storage means for storing the determination status decided by the determination status decision means; and output control means for performing output control in accordance with the result of diagnosis, based on the determination status decided by the determination status decision means, wherein the determination status decision means decides the determination status by performing status transition processing to change a determination status during a previous trip period stored in the storage means to a new determination status when necessary, characterized in that the determination status is stored into the storage means, as a numerical value set in correspondence with each determination status while avoiding mutual numerical overlap.

2. The apparatus as in claim 1, wherein:

numerical value stored in the storage means is within a range of 0 to 255 which can be defined by a single byte.

3. The control apparatus as in claim 1, wherein:

the storage means includes a battery backup volatile memory or an electrically rewritable non-volatile memory.

4. The control apparatus as in claim 1, wherein:

the output control means at least on/off-controls a warning light to notify an abnormality and controls output of abnormality code indicating the content of the abnormality.

5. A computer-readable recording medium containing a computer program for causing a computer system to function as the detection means, the determination status decision means and the output control means of the vehicle control apparatus according to claim 1.

6. A vehicle control apparatus having a diagnosis function comprising:

detection means for detecting a predetermined diagnostic item as normal or abnormal during a trip period of a vehicle as a running period from a point in which an ignition switch is turned on to a point in which an ignition switch is turned off;

determination status decision means for deciding a determination status indicating the result of diagnosis of the diagnosis item, based on the result of detection by the detection means;

storage means for storing the determination status decided by the determination status decision means; and output control means for performing output control in accordance with the result of diagnosis, based on the determination status decided by the determination status decision means, wherein the determination status decision means decides the determination status by performing status transition processing to change a determination status during a previous trip period stored in the storage means to a new determination status when necessary, characterized in that the determination status is stored into the storage means, as a numerical value set in correspondence with each determination status while avoiding mutual numerical overlap;

the numerical value corresponding to the determination status is set as a value within a predetermined range corresponding to each determination status; and the status transition processing is made by increasing or decreasing the numerical value in accordance with the numerical value corresponding to the determination status stored in the storage means.

7. The apparatus as in claim 6, wherein:

the numerical value corresponding to the determination status is incremented or decremented by a predetermined value at every trip period of the vehicle in the status transition processing, when the determination status is changed by counting the number of continuation of the trip period in which the detection result of the detection means remains the same.

8. The control apparatus as in claim 7, wherein:

the numerical value corresponding to the determination status is changed by a predetermined value each time the diagnostic item is decided as normal in the status transition processing, when the determination status is changed from a fully abnormal state to a fully normal state.

9. The control apparatus as in claim 8, wherein:

the numerical value corresponding to the determination status is changed by a predetermined value in the status transition processing until the numerical value reaches a value indicative of the fully normal status, when the diagnostic item is determined as normal by the decision means.

10. The control apparatus as in claim 7, wherein:

the numerical value corresponding to the determination status is changed only at a first determination in the status transition processing thereby to change the numerical value at every trip period, even when the detection means detects the same status repeatedly within the trip period.

11. The control apparatus as in claim 6, wherein:

the storage means includes a battery backup volatile memory or an electrically rewritable non-volatile memory.

12. The control apparatus as in claim 6, wherein:

the output control means at least on/off-controls a warning light to notify an abnormality and controls output of abnormality code indicating the content of the abnormality.

13. The control apparatus as in claim 6, wherein:

a numerical value indicating an undetected status is stored as the determination status in the storage means until the determination status decision means decides the determination status during a first trip period.

14. A computer-readable recording medium containing a computer program for causing a computer system to function as the detection means, the determination status decision means and the output control means of the vehicle control apparatus according to claim 6.

15. A vehicle control apparatus having a diagnosis function comprising:

detection means for detecting a predetermined diagnostic item as normal or abnormal during a trip period of a vehicle as a running period from a point in which an ignition switch is turned on to a point in which an ignition switch is turned off;

determination status decision means for deciding a determination status indicating the result of diagnosis of the diagnostic item, based on the result of detection by the detection means;

storage means for storing the determination status decided by the determination status decision means; and output control means for performing output control in accordance with the result of diagnostic, based on the determination status decided by the determination status decision means, wherein the determination status decision means decides the determination status by performing status transition processing to change a determination status during a previous trip period stored in the storage means to a new determination status when necessary, characterized in that the determination status is stored into the storage means, as a numerical value set in correspondence with each determination status while avoiding mutual numerical overlap; and a numerical value indicating an undetected status is stored as the determination status in the storage means until the determination status decision means decides the determination status during a first trip period.

16. The control apparatus as in claim 15, wherein:

the numerical value stored in the storage means is within a range of 0 to 255 which can be defined by a single byte.

17. The control apparatus as in claim 15, wherein:

the storage means includes a battery backup volatile memory or an electrically rewritable non-volatile memory.

18. The control apparatus as in claim 15, wherein:

the output control means at least on/off-controls a warning light to notify an abnormality and controls output of abnormality code indicating the content of the abnormality.

19. A computer-readable recording medium containing a computer program for causing a computer system to function as the detection means, the determination status decision means and the output control means of the vehicle control apparatus according to claim 15.

20. A vehicle control apparatus having a diagnosis function comprising:

detection means for detecting a predetermined diagnostic item as normal or abnormal during a trip period of a vehicle as a running period from a point in which an ignition switch is turned on to a point in which an ignition switch is turned off;

determination status decision means for deciding a determination status indicating the result of diagnosis of the diagnostic item, based on the result of detection by the detection means;

storage means for storing the determination status decided by the determination status decision means; and output control means for performing output control in accordance with the result of diagnosis, based on the determination status decided by the determination status decision means, wherein the determination status decision means decides the determination status by performing status transition processing to change a determination status during a previous trip period stored in the storage means to a new determination status when necessary, characterized in that the determination status is stored into the storage means, as a numerical value set in correspondence with each determination status while avoiding mutual numerical overlap;

the status transition processing includes changing at a start of each trip period the numerical value stored in the previous trip period and changing the numerical value in response to the result of detection by the detection means after the start of each trip period.

21. The control apparatus as in claim 20, wherein:

the storage means includes a battery backup volatile memory or an electrically rewritable non-volatile memory.

22. The control apparatus as in claim 20, wherein:

the output control means at least on/off-controls a warning light to notify an abnormality and controls output of abnormality code indicating the content of the abnormality.

23. The control apparatus as in claim 20, wherein:

a numerical value indicating an undetected status is stored as the determination status in the storage means until the determination status decision means decides the determination status during a first trip period.

24. A computer-readable recording medium containing a computer program for causing a computer system to function as the detection means, the determination status decision means and the output control means of the vehicle control apparatus according to claim 20.

25. A method of controlling a vehicle, the method comprising:

detecting a predetermined diagnostic item as normal or abnormal during a trip period of a vehicle as a running period from a point in which an ignition switch is turned on to a point in which the ignition switch is turned off;

deciding a determination status indicating the result of diagnosis of the diagnostic item, based on the result of the detection of the predetermined diagnostic item;

storing the determination status that has been decided in a storage memory;

performing output control in accordance with the result of diagnostic, based on the determination status that has been decided;

wherein deciding the determination status is performed by status transition processing to change a determination status during a previous trip period stored in the storage memory to a new determination status when necessary;

the determination status is stored into the storage memory as a numerical value set in correspondence with each determination status while avoiding mutual numerical overlap;

the numerical value corresponding to the determination status is set as a value within a predetermined range corresponding to each determination status; and the status transition processing is made by increasing or decreasing the numerical value in accordance with the numerical value corresponding to the determination status stored in the storage memory.

26. The method in claim 25, wherein:

the numerical value corresponding to the determination status is incremented or decremented by a predetermined value at every trip period of the vehicle in the status transition processing, when the determination status is changed by counting the number of continuation of the trip period in which the detection result of the predetermined diagnostic item remains the same.

27. The method as in claim 26, wherein:

the numerical value corresponding to the determination status is changed by a predetermined value each time the diagnostic item is decided as normal in the status transition processing, when the determination status is changed from a fully abnormal state to a fully normal state.

28. The method as in claim 27, wherein:

the numerical value corresponding to the determination status is changed by a predetermined value in the status transition processing until the numerical value reaches a value indicative of the fully normal status, when the diagnostic item is determined as normal.

29. The method as in claim 26, wherein:

the numerical value corresponding to the determination status is changed only at a first determination in the status transition processing thereby to change the numerical value at every trip period, even when the same status is repeatedly detected within the trip period.

30. A method of controlling a vehicle, the method comprising:

detecting a predetermined diagnostic item as normal or abnormal during a trip period of a vehicle as a running period from a point in which an ignition switch is turned on to a point in which the ignition switch is turned off;

deciding a determination status indicating the result of diagnosis of the diagnostic item, based on the result of the detection of the predetermined diagnostic item;

storing the determination status that has been decided in a storage memory;

performing output control in accordance with the result of diagnosis, based on the determination status that has been decided;

wherein deciding the determination status is performed by status transition processing to change a determination status during a previous trip period stored in the storage memory to a new determination status when necessary, the determination status is stored in the storage memory as a numerical value set in correspondence with each determination status while avoiding mutual numerical overlap, a numerical value indicating an undetected status is stored as the determination status in the storage memory until the determination status is decided during a first trip period.

31. The method as in claim 30, wherein:

the numerical value stored in the storage memory is within range of 0 to 255 which can be defined by a single byte.

32. The method as in claim 30, wherein:

the storage memory includes a battery backup volatile memory or an electrically rewritable non-volatile memory.

33. The method as in claim 30, wherein:

a warning light is on/off controlled to notify an abnormality and controls output of abnormality code indicating the content of the abnormality.

34. A method of controlling a vehicle, the method comprising:

detecting a predetermined diagnostic item as normal or abnormal during a trip period of a vehicle as a running period from a point in which an ignition switch is turned on to a point in which the ignition switch is turned off;

deciding a determination status indicating the result of diagnosis of the diagnostic item, based on the result of the detection of the predetermined diagnostic item;

storing the determination status that has been decided in a storage memory;

performing output control in accordance with the result of diagnosis, based on the determination status that has been decided;

wherein deciding the determination status is performed by status transition processing to change a determination status during a previous trip period stored in the storage memory to a new determination status when necessary;

the determination status is stored in the storage memory as a numerical value set in correspondence with each determination status while avoiding mutual numerical overlap;

the status transition processing includes changing at a start of each trip period the numerical value stored in the previous trip period and changing the numerical value in response to the result detection of the predetermined diagnostic item after the start of each trip period.

* * * * *